Culp & Keeney,
Pitman Coupling.
No 2,603. Reissued May 14, 1867.
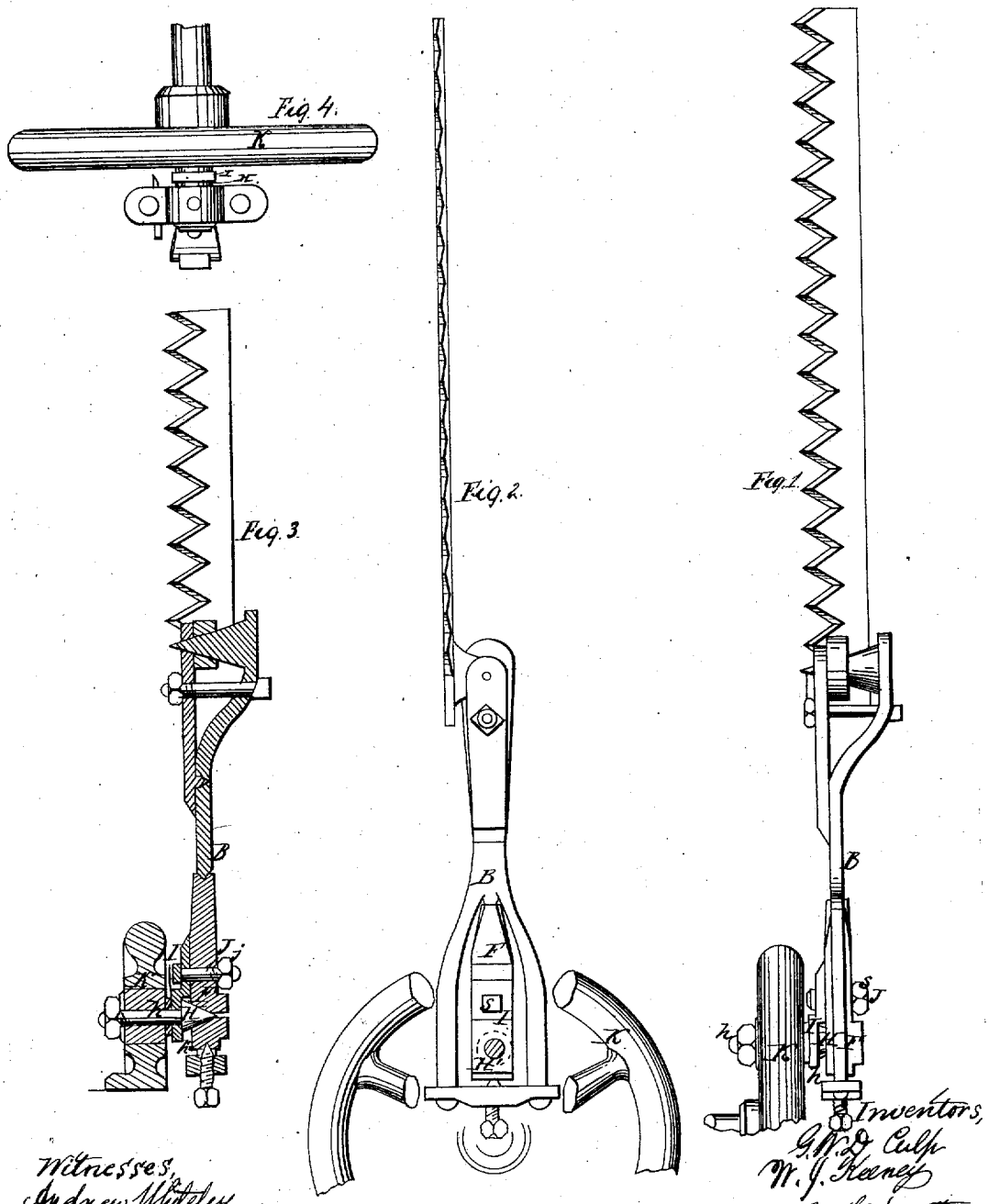
AM. PHOTO-LITHO. CO. N.Y. (OSBORNE'S PROCESS)

United States Patent Office.

GEORGE W. D. CULP, OF ALLENSVILLE, AND WILLIAM J. KEENEY, OF FLORENCE, INDIANA.

*Letters Patent No.* 39,633, *dated August* 25, 1863; *reissue No.* 2,603, *dated May* 14, 1867.

DIVISION B.

IMPROVEMENT IN HARVESTER CUTTER-BAR CONNECTION.

The Schedule referred to in these Letters Patent and making part of the same.

TO ALL WHOM IT MAY CONCERN:

Be it known that we, G. W. D. CULP, of Allensville, and W. J. KEENEY, of Florence, in the county of Switzerland, and State of Indiana, have invented a new and useful Improvement in Mounting and Communicating Motion to the Cutting Apparatus of Harvesting Machines; and we do hereby declare the following to be a full, clear, and exact description of the same, reference being had to the accompanying drawings, in which—

Figure 1 is a plan view of our invention.

Figure 2 is a side elevation of the same.

Figure 3 is a horizontal longitudinal section of the same.

Figure 4 is an elevation of the inner end of the pitman.

The violent movements of the cutting apparatus of a harvesting machine cause very rapid destruction of bearings and boxes at each end of the pitman, and it is the object of that part of this invention embraced in this patent to provide an effectual means of taking up lost motion at the crank-wrist as the journal and its box become loose by wear; and it consists, first, in the use of a conical or conoidal point, H, attached to the crank K, and inserted in a correspondingly shaped socket in the inner end of the pitman, by means of which all lost motion may be taken up as the journal and its box become loose by wear; second, in securing said conical head within its socket, by means of a shoulder or collar upon said head and a bearing plate attached to said pitman. This invention is particularly adapted to solid boxes, such as are commonly used, as it affords ample means of taking up lost motion.

That others may understand the construction and operation of our invention, we will describe it.

H represents a conical or conoidal journal or point fitting a socket in the inner end of the pitman B. This socket is shaped so as to correspond with the form of the journal H, and the form of each being as above specified, conical or conoidal, it is evident that as they become loose from wear the lost motion may be taken up by inserting the journal further into its socket. The shank *h* of the journal H may constitute the wrist of the crank or fly-wheel K, or it may be connected thereto in any other suitable way. The journal H is formed with a shoulder or collar, *h'*, behind which a bearing plate, I, extends. This bearing plate is secured to the pitman, and confines the head of the journal H between it and said pitman. It is also provided with a binding screw, J, and screw-nut *j*, which enables the attendant to tighten up the box and take up lost motion at any time. The socket in the solid box F, into which the journal H is inserted, is drilled entirely through at its centre, so that the point of said journal shall not bear against the box, and thus cause the wear to be unequal, and so that a lubricant may, without difficulty, be injected. It is evident that with journal connections as above described, there will be no liability or danger of changing the distance between centres or the effective length of the pitman by the operation of taking up lost motion, because, the box F being solid, and the movement of the box and journal upon each other, during the operation of tightening up the box, at right angles to the axis of the pitman, there can be no change of length.

Having described our invention, what we claim as new, and desire to secure by Letters Patent, is—

The conical or conoidal point H, constructed with a shoulder or collar, *h'*, to form a bearing for the confining plate I, substantially as and for the purpose set forth.

The single conical or conoidal wrist or journal H, in combination with the solid box F, having a corresponding socket and confining plate I, as described and for the purpose set forth.

GEO. W. D. CULP,
WM. J. KEENEY.

Witnesses:
WM. LAND,
GEO. W. KNAPP,
JOHN W. REXFORD.